US012608252B2

(12) United States Patent
Ahuja et al.

(10) Patent No.: US 12,608,252 B2
(45) Date of Patent: Apr. 21, 2026

(54) SYSTEM AND METHOD FOR AUTOMATED BI-DIRECTIONAL MAPPING BETWEEN SERVICE SPECIFICATIONS

(71) Applicant: Rakuten Mobile, Inc., Tokyo (JP)

(72) Inventors: Rajasi Ahuja, Tokyo (JP); Abhishek Pawankumar Sharma, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 404 days.

(21) Appl. No.: 18/250,351

(22) PCT Filed: Dec. 21, 2022

(86) PCT No.: PCT/US2022/053633
§ 371 (c)(1),
(2) Date: Apr. 24, 2023

(87) PCT Pub. No.: WO2024/136858
PCT Pub. Date: Jun. 27, 2024

(65) Prior Publication Data
US 2025/0077324 A1     Mar. 6, 2025

(51) Int. Cl.
*G06F 16/00* (2019.01)
*G06F 9/54* (2006.01)
*G06F 16/20* (2019.01)

(52) U.S. Cl.
CPC .............. *G06F 9/547* (2013.01); *G06F 16/20* (2019.01)

(58) Field of Classification Search
CPC ....................................................... G06F 16/20
See application file for complete search history.

(56) References Cited

U.S. PATENT DOCUMENTS 11,204,961 B1    12/2021    Farber et al.
11,269,889 B1     3/2022    Aversano et al.
2020/0236143 A1   7/2020    Zou et al.

*Primary Examiner* — Ajith Jacob
(74) *Attorney, Agent, or Firm* — HAUPTMAN HAM, LLP

(57) ABSTRACT

A method for bi-directional mapping includes storing a relationship between a first service specification and a second service specification; receiving an application programming interface (API) call for the second service specification that includes a payload that includes a relationship type; verifying the relationship type included in the payload corresponds to a relationship type of the relationship between the first service specification and the second service specification; in response to the relationship type included in the payload corresponding to the relationship type of the relationship between the first service specification and the second service specification, verifying whether a complimentary relationship exists between the first service specification and the second service specification; and in response to the complimentary relationship existing between the first service specification and the second service specification; updating the first service specification with dependent service details of the relationship between the first service specification and the second service specification.

20 Claims, 9 Drawing Sheets

400

| SNO | Service Specification Role | Relationship Type | Target Service Specification Role |
|-----|---------------------------|-------------------|-----------------------------------|
| 1 | App Bundle | Supplies to CNFT | Network Function Template |
| 2 | Network Function Template | Depends on App Bundle | App Bundle |
| | 404 | 406 | 408 |

402

SYSTEM AND METHOD FOR AUTOMATED BI-DIRECTIONAL MAPPING BETWEEN SERVICE SPECIFICATIONS

RELATED APPLICATIONS

The present application is a National Phase of International Application No. PCT/US2022/053633, filed Dec. 21, 2022.

TECHNICAL FIELD

This description relates to a system for automated bi-directional mapping between service specifications and method of using the same.

BACKGROUND

A cellular network is a telecommunication system of mobile devices (e.g., mobile phone devices) that communicate by radio waves through one or more local antenna at a cellular base station (e.g., cell tower). Cellular service is provided to coverage areas that are divided into small geographical areas called cells. Each cell is served by a separate low-power-multichannel transceiver and antenna at the cell tower. Mobile devices within a cell communicate through that cell's antenna on multiple frequencies and on separate frequency channels assigned by the base station from a pool of frequencies used by the cellular network.

A radio access network (RAN) is part of the telecommunication system and implements radio access technology. RANs reside between a device, such as a mobile phone, a computer, or remotely controlled machine, and provides connection with a core network (CN). Depending on the standard, mobile phones and other wireless connected devices are varyingly known as user equipment (UE), terminal equipment (TE), mobile station (MS), and the like.

SUMMARY

In some embodiments, a method for bi-directional mapping includes storing, by a processor, a relationship between a first service specification and a second service specification within a database; receiving, by the processor, an application programming interface (API) call for the second service specification that includes a payload that includes a relationship type; verifying, by the processor, the relationship type included in the payload corresponds to a relationship type of the relationship between the first service specification and the second service specification stored within the database; in response to the relationship type included in the payload corresponding to the relationship type of the relationship between the first service specification and the second service specification stored within the database, verifying, by the processor, whether a complimentary relationship exists between the first service specification and the second service specification; and in response to the complimentary relationship existing between the first service specification and the second service specification, updating, by the processor, the first service specification with dependent service details of the relationship between the first service specification and the second service specification.

In some embodiments, an apparatus includes a processor; and a memory having instructions stored thereon that, in response to being executed by the processor, cause the apparatus to store a relationship between a first service specification and a second service specification within a database; receive an application programming interface (API) call for the second service specification that includes a payload that includes a relationship type; verify the relationship type included in the payload corresponds to a relationship type of the relationship between the first service specification and the second service specification stored within the database; in response to the relationship type included in the payload corresponding to the relationship type of the relationship between the first service specification and the second service specification stored within the database, verify whether a complimentary relationship exists between the first service specification and the second service specification; and in response to the complimentary relationship existing between the first service specification and the second service specification, update the first service specification with dependent service details of the relationship between the first service specification and the second service specification.

In some embodiments, a non-transitory computer readable medium having instructions stored thereon that, in response to being executed by a processor, cause an apparatus to store a relationship between a first service specification and a second service specification within a database; receive an application programming interface (API) call for the second service specification that includes a payload that includes a relationship type; verify the relationship type included in the payload corresponds to a relationship type of the relationship between the first service specification and the second service specification stored within the database; in response to the relationship type included in the payload corresponding to the relationship type of the relationship between the first service specification and the second service specification stored within the database, verify whether a complimentary relationship exists between the first service specification and the second service specification; and in response to the complimentary relationship existing between the first service specification and the second service specification, update the first service specification with dependent service details of the relationship between the first service specification and the second service specification.

BRIEF DESCRIPTION OF THE DRAWINGS

Aspects of the present disclosure are understood from the following detailed description when read with the accompanying FIGS. In accordance with the standard practice in the industry, various features are not drawn to scale. In some embodiments, dimensions of the various features are arbitrarily increased or reduced for clarity of discussion.

DETAILED DESCRIPTION

Figure 1:
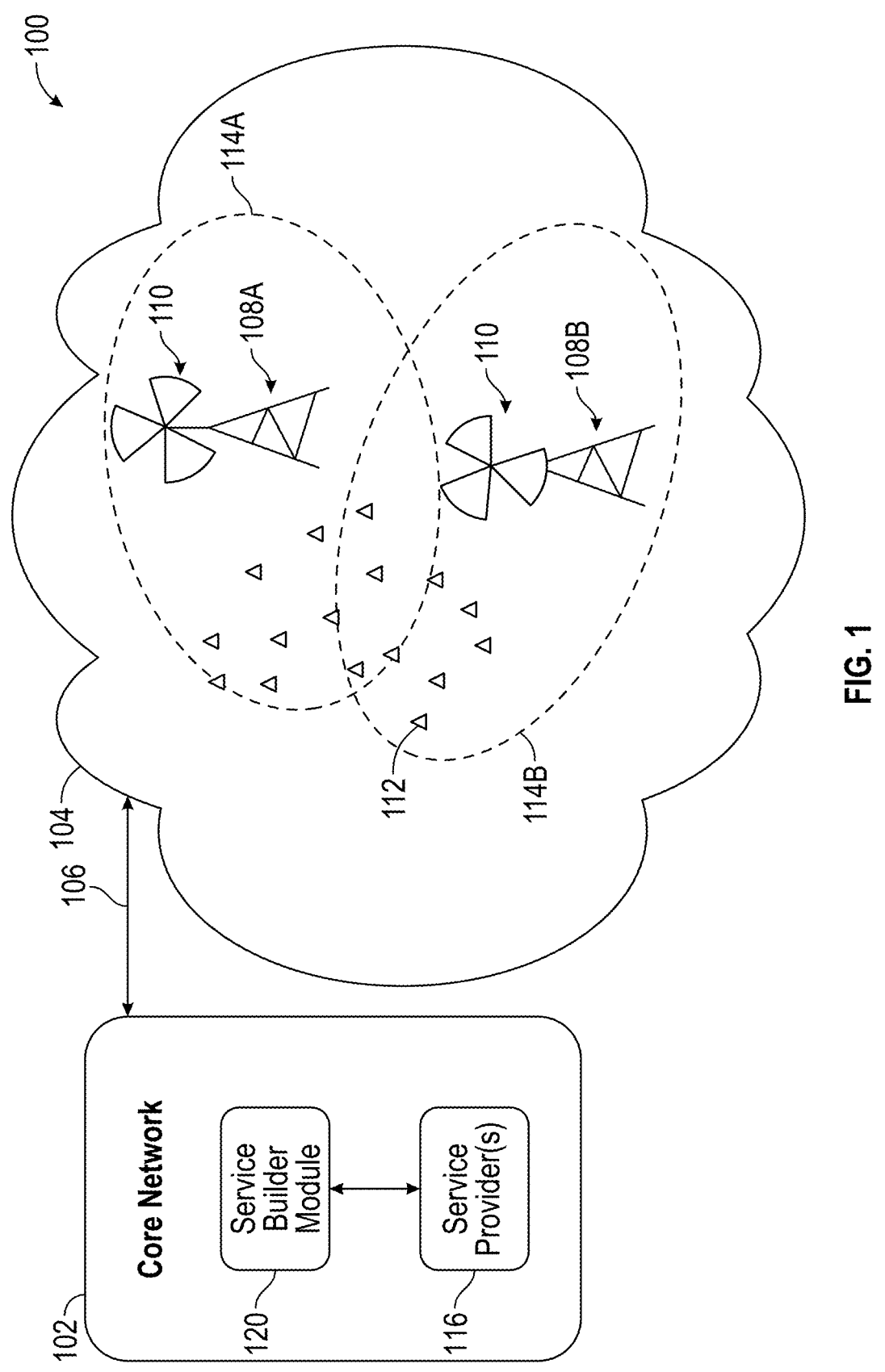
FIG. 1 is a diagrammatic representation of a system for network slice design (NSD), in accordance with some embodiments.

The following disclosure provides many different embodiments, or examples, for implementing distinctive features of the discussed subject matter. Examples of components, values, operations, materials, arrangements, or the like, are described below to simplify the embodiments. These are, of course, examples and are unintended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to be in direct contact. In addition, some embodiments repeat reference numerals and/or letters in the numerous examples. This repetition is for the purpose of simplicity and clarity and is unintended to dictate a relationship between the various embodiments and/or configurations discussed.

Further, spatially relative terms, such as beneath, below, lower, above, upper and the like, are used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

A network service (NS) bundle is a bundle which includes technology services, configuration, manifest files, or other suitable services and files within the scope of some embodiments. The technology services are further subdivided into different network service descriptors (NSDs) and virtualized network function descriptors (VNFDs). The VNFDs are created with application bundles.

An application bundle file is a single, relocatable file that contains the artifacts to execute an application. An application bundle file is set to run on an instance (or instantiation). Application files are relocated by moving the application bundle file. Except for system libraries, the application bundle file includes toolkit artifacts that are used to execute the application. The application does not access external toolkits when running on execution hosts (e.g., a smartphone used by a subscriber). Logically, an application bundle file includes parts of the application directory and the output directory, plus subdirectories from toolkits that contributed to the application. When an application bundle file is submitted for execution, the application bundle file is deployed to all hosts on which the application runs. The application bundle file is then unbundled into a runtime application directory hierarchy that is similar to a compile-time hierarchy with the addition of any external toolkit entities. An application bundle file has an identifier that uniquely distinguishes one build of an application from another. When an application bundle file is submitted for execution, the identifier is used to check whether there is another instance of the same application already running, and if so, it shares the unbundled execution location. In this case, the same runtime application directory hierarchy is used for executions of a given application bundle file.

A NSD is a deployment template which includes information used by a network function virtualization orchestrator (NFVO) for life cycle management of a network service (NS). An NS is a composition of network functions (NFs or applications) arranged as a set of functions with unspecified connectivity between the NFs or according to one or more forwarding graphs.

A network slice (a portion of the original network architecture that is divided or sliced into multiple logical and independent networks that are configured to effectively meet the various services requirements) is broken up into subnets where each subnet is dedicated to a specific domain (e.g., RAN, CN, transport domain, or end-to-end (E2E) that includes each). The transport domain references the telecommunication transmission facilities under which voice, data, and video communications are distributed between distant locations for use on a shared basis.

Within a subnet is one or more NSs or a bundle of NSs. Within a NS is one or more NFs or a bundle of NFs. An application bundle (e.g., a bundle containing the executable code of an application and its associated resources) is registered at an orchestrator bundle catalog (orchestration is the automated configuration, coordination, and management of computer systems and software). An onboarding service creates the bundle/package objects in a central inventory. The onboarding service sends a request to a policy manager for creating the policy descriptor files (without source element universally unique identifiers (UUIDs), which are 128-bit labels used for information in computer systems).

When generated according to the standard methods, UUIDs are, for practical purposes, unique. Their uniqueness does not depend on a central registration authority or coordination between the parties generating them, unlike most other numbering schemes. While the probability that a UUID will be duplicated is not zero, it is close enough to zero to be negligible. Thus, a UUID is created by anyone and used to identify something with near certainty that the identifier does not duplicate one that has already been, or will be, created to identify something else. Information labelled with UUIDs by independent parties therefore is later combined into a single database or transmitted on the same channel, with a negligible probability of duplication.

A policy manager determines the degree to which a service/device is allowed to do what the service/device is attempting/requesting (decision), and is then able to enforce the decision (enforcement). Some examples of policies include (1) is the customer allowed to use this service, (2) is there enough capacity to support this new service, (3) what happens to non-SLA (service level agreement) customers when a node approaches congestion, and (4) is the service request/activity a security threat?

The policy manager sends back a policy ID to the orchestrator and the orchestrator stores the policy ID with the package ID. A NF instantiation request is received from a user (e.g., instantiate a NF using a NFT (network function template) which includes a policy descriptor file with policy ID).

The instance is created in a central inventory. The orchestrator deploys the NF/application and sends notification to the policy manager for enabling the policies with respective policy IDs. The policy files are modified with pending (source element UUID or the like) information. After modifying the pending information, the descriptor is referenced as policy template. Now the policy template is ready for activation by a user.

In some embodiments, automated bi-directional mapping between NS specifications is disclosed.

In other approaches, a bidirectional relationship is maintained between a NS bundle and artifact service specifications when storing a NS bundle. These relationships are used to fetch NS specifications by one or more applications. There is no check or implementation to assert whether the relationships, which are agreed upon beforehand, are considered valid.

Artifacts are separate documents constituting architecture. Artifacts provide descriptions from different perspectives for various actors. Artifacts are used for improving communication between different actors.

As an example of other approaches, an application bundle NS specification is stored in a catalog, such as a bundle catalog. In order to link a NF template to the bundle, the catalog allows certain relationships like "Depends On App Bundle" and not a random relationship like "XYZ" as the relationship "XYZ" is considered invalid as it does not describe a relationship.

When registering a bundle, an engineer traces from the application bundle to the artifact NS specification and vice versa. However, for a NS, to make a relationship of one NS specification to thirty other NS specifications, the tele-management forum (TMF) expects thirty PATCH calls to be sent to add relationships to an already existing NS specification. This process increases the load on the system and the user, decreases the efficiency, and makes the application less user friendly.

TMF is a global industry association for service providers and suppliers in the telecommunications industry. Members include communications and digital service providers, telephone companies, cable operators, network operators, cloud providers, digital infrastructure providers, software suppliers, equipment suppliers, systems integrators, and management consultancies.

In computing, a PATCH is a request method in hypertext transfer protocol (HTTP) for making partial changes to an existing resource. The PATCH method provides an entity containing a list of changes to be applied to the resource requested using the HTTP Uniform Resource Identifier (URI). The list of changes are supplied in the form of a PATCH document. In response to the requested resource not existing, the server creates the resource depending on the PATCH document media type and permissions. The changes described in the PATCH document are semantically well defined but have a different media type than the resource being patched.

In some embodiments, two or more NSs are configured to have many relationships related to many relationships. Other approaches have been unable to store these relationships in a database so that some of the relationships between the two or more services are configured to be added/deleted in the future. In some embodiments, in response to having a bidirectional relationship between two or more NS specifications, an engineer makes the two or more NS specifications unidirectional. Further, in some embodiments, an engineer converts a unidirectional relationship to bi-directional.

In some embodiments, predefined relationships between a bundle and artifacts, a NS template, and descriptors are stored in catalog database, such as a service catalog. In some embodiments, on getting a POST call, the service catalog checks whether a relationship between two or more specifications provide in the NS specification relationship is valid or not. In response to the relationship being stored in the service catalog database then the relationship is valid. In response to the relationship being valid, then the service catalog registers the NS specification.

A service catalog is an organized and curated collection of any business and information technology (IT) related services that are performed by, for, or within an enterprise. Service catalogs act as knowledge management tools for the employees and consultants of an enterprise, allowing them to route their requests for and about services and service-related topics to the subject matter experts who own, are accountable for, and operate them. Each service within such service catalogs is usually very repeatable and has controlled inputs, processes, and outputs.

In computing, POST is a request method supported by HTTP used by the World Wide Web (WWW). By design, the POST request method requests that a web server accept the data enclosed in the body of the request message, most likely for storing. POST is often used when uploading a file or when submitting a completed web form. As part of a POST request, an arbitrary amount of data of any type is sent to the server in the body of the request message. A header field in the POST request usually indicates the message body's Internet media type.

In some embodiments, the service catalog verifies whether a complimentary relationship is registered. In some embodiments, the service catalog updates the NS specification mentioned in the NS specification relationship and makes the complimentary relationship to the NS specification. No additional PATCH requests, such as described above, are called for by a user/engineer. In a non-limiting example, application bundles are registered, then the NF templates are registered, and a complimentary relationship is made between the application bundles and the NF templates.

In some embodiments, this complimentary relationship process simplifies the creation of a bi-directional relationship between two NS specifications. In some embodiments, the process improves performance and reduces user involvement (e.g., reduces the number of PATCH calls). In some embodiments, the service catalog performs the PATCH calls. In some embodiments, the process increases efficiency as human intervention is reduced thereby reducing errors caused by human interaction.

FIG. 1 is a diagrammatic representation of a system for network slice design (NSD) 100, in accordance with some embodiments.

NSD system 100 includes a CN 102 communicatively connected to RAN 104 through transport network 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). CN 102 includes one or more service provider(s) 116, KPI servers 118, and service builder module 120.

CN 102 (further known as a backbone) is a part of a computer network which interconnects networks, providing a path for the exchange of information between different local area networks (LANs) or subnetworks. In some embodiments, CN 102 ties together diverse networks over wide geographic areas, in different buildings in a campus environment, or in the same building.

In some embodiments, RAN 104 is a global system for mobile communications (GSM) RAN, a GSM/EDGE RAN, a universal mobile telecommunications system (UMTS) RAN (UTRAN), an evolved UMTS terrestrial radio access network (E-UTRAN), open RAN (O-RAN), or cloud-RAN (C-RAN). RAN 104 resides between UE 112 (e.g., mobile phone, a computer, or any remotely controlled machine) and CN 102. In some embodiments, RAN 104 is a C-RAN for purposes of simplified representation and discussion. In some embodiments, base band units (BBU) replace the C-RAN.

In a hierarchical telecommunications network, transport network 106 of NSD system 100 includes the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul refers to the side of the network that communicates with the Internet. The connection between base station 108 and UE 112 begins with transport network 106 connected to CN 102. In some embodiments, transport network 106 includes wired, fiber optic, and wireless components. Wireless sections include using microwave bands, mesh, and edge network topologies that use high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a remote radio head (RRH), primary and backup electrical power sources, and sheltering. Base stations are known by other names such as base transceiver station, mobile phone mast, or cell tower. In some embodiments, other edge devices are configured to wirelessly communicate with UEs. The edge device provides an entry point into service provider CNs, such as CN 102. Examples include routers, routing switches, integrated access devices (IADs), multiplexers, and a variety of metropolitan area network (MAN) and wide area network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc are 60°, 90°, or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or ultra-high frequency (UHF) frequencies (300 MHz to 3 GHz). In other examples, antenna(s) 110 are chosen for their size and directional properties. In some embodiments, the antenna(s) 110 are MIMO (multiple-input, multiple-output) antennas that send and receive greater than one data signal simultaneously over the same radio channel by exploiting multipath propagation.

In some embodiments, UEs 112 are a computer or computing system. Additionally, or alternatively, UEs 112 have a liquid crystal display (LCD), light-emitting diode (LED) or organic light-emitting diode (OLED) screen interface, such as user interface (UI) 822 (FIG. 8), providing a touchscreen interface with digital buttons and keyboard or physical buttons along with a physical keyboard. In some embodiments, UE 112 connects to the Internet and interconnects with other devices. Additionally, or alternatively, UE 112 incorporates integrated cameras, the ability to place and receive voice and video telephone calls, video games, and Global Positioning System (GPS) capabilities. Additionally, or alternatively, UEs run operating systems (OS) that allow third-party apps specialized for capabilities to be installed and run. In some embodiments, UEs 112 are a computer (such as a tablet computer, netbook, digital media player, digital assistant, graphing calculator, handheld game console, handheld personal computer (PC), laptop, mobile Internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In some embodiments, geographic coverage cells 114 include a shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate.

Service provider(s) 116 or CSPs are businesses, vendors, customers, or organizations that sell bandwidth or network access to subscribers (utilizing UEs) by providing direct Internet backbone access to Internet service providers and usually access to network access points (NAPs). Service providers are sometimes referred to as backbone providers, Internet providers, or vendors. Service providers include telecommunications companies, data carriers, wireless communications providers, Internet service providers, and cable television operators offering high-speed Internet access.

In some embodiments, service builder module 120 is configured to allow a user to design one or more network slices. In some embodiments, the network slice design is GUI based. In some embodiments, operations include a user inputting basic information such as, network slice name, slice type, domains, and shared or non-shared slice selection. Other operations include defining a slice such as, NS profile parameters (holds the original requirement of communication-service-instance, such as latency, data-rate, and mobility-level) requested by a northbound interface (e.g., internal to the system or manually from a user) and conversion of NS profile parameters to slice profile parameters (holds the slice sub-net parameter info of different network domain slice subnet instances (NSSIs), such as RAN, transport network (TN), and CN NSSI).

In some embodiments, service builder module 120 is configured to unify policy onboarding, such as a network function/network services (NF)/(NS) package onboarding.

Figure 2:
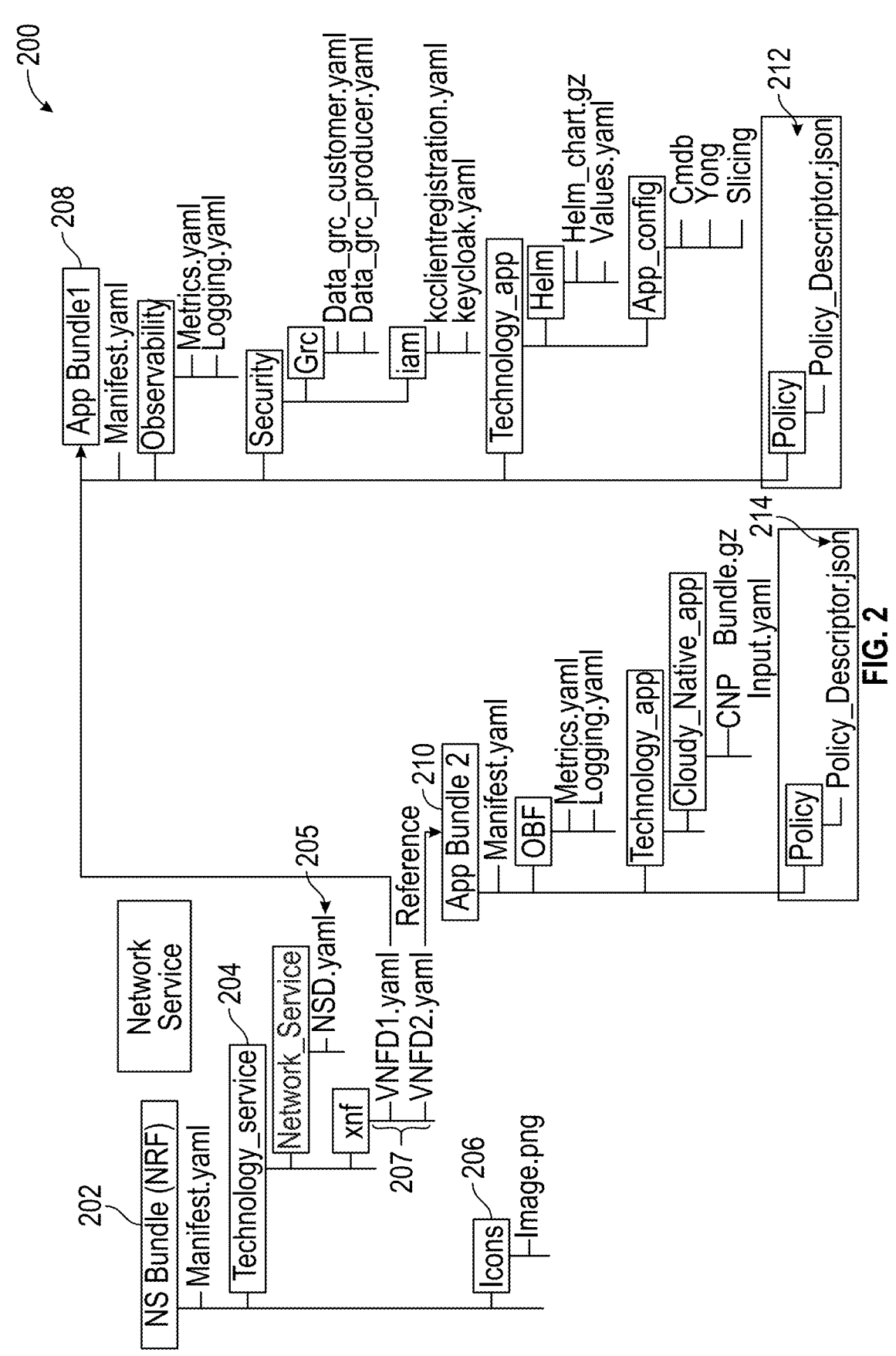
FIG. 2 is a pictorial representation of a universal network service (NS) bundle, in accordance with some embodiments.

FIG. 2 is a pictorial representation of a universal NS bundle 200, in accordance with some embodiments.

For purposes of this discussion, application and network function are used interchangeably unless otherwise distinguished from one another.

In FIG. 2, a NS bundle 202 is an amalgamation of technology services 204 (and other services like icons 206)

which is further subdivided into different NSDs 205 and VNFDs 207. In some embodiments, VNFDs 207 are created with application bundles 208, 210. In some embodiments, a policy descriptor 212 and 214 is part of application bundles 208 and 210. In some embodiments, policy descriptor files 212 and 214 are of a JavaScript Object Notification (JSON) format. In some embodiments, the policy bundle is part of a network service (NS)/(NF) network function bundle which includes other artifacts such as technology application images, metrics, configuration files, or other suitable files within the scope of some embodiments.

JSON is an open standard file format and data interchange format that uses human-readable text to store and transmit data objects consisting of attribute-value pairs and arrays (or other serializable values). JSON is a data format with diverse uses in electronic data interchange, including that of web applications with servers. JSON is a language-independent data format. JSON was derived from JavaScript, but many modern programming languages include code to generate and parse JSON-format data. JSON filenames use the extension json.

Figure 3:
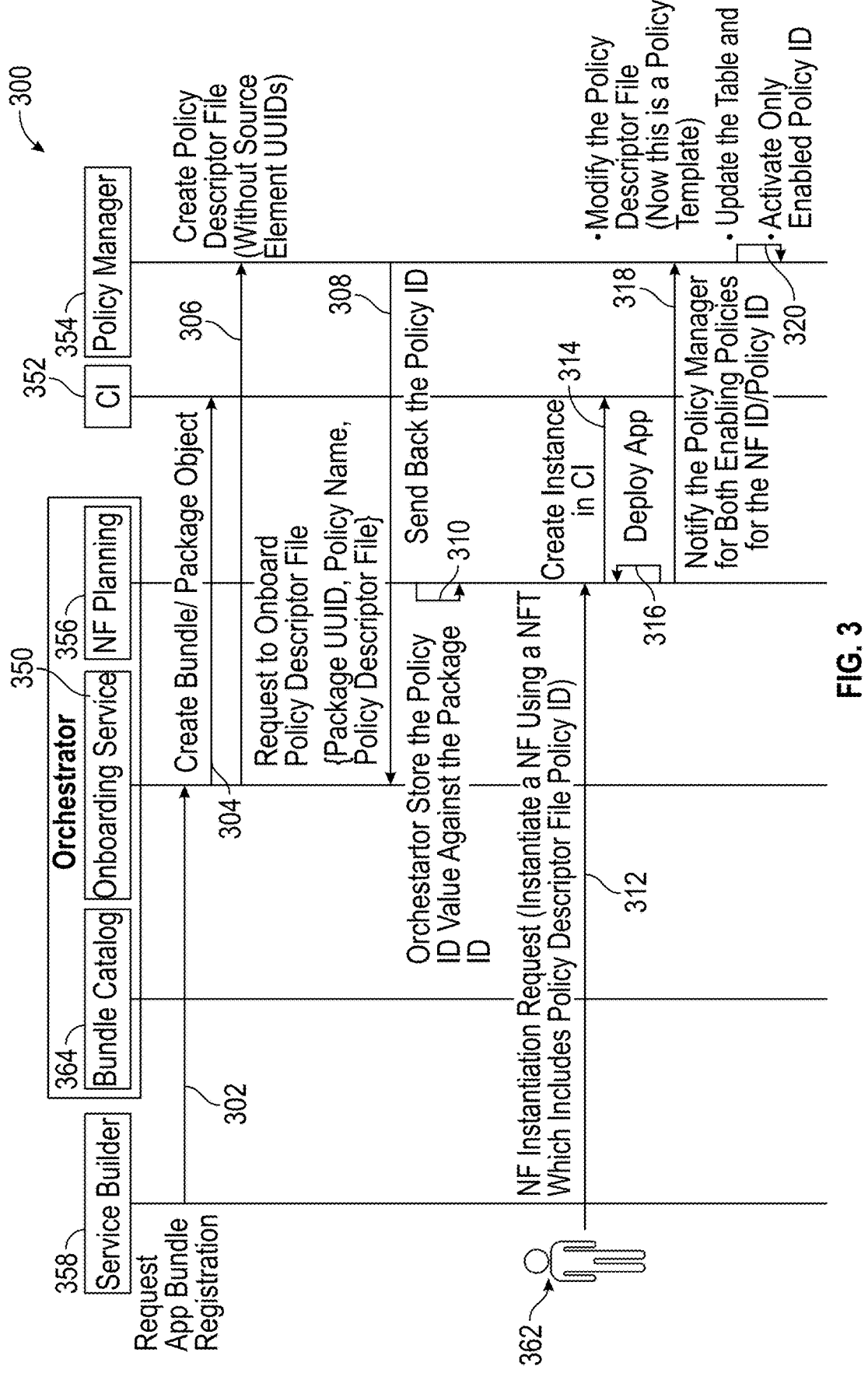
FIG. 3 is a data flow diagram of a method for policy onboarding unification, in accordance with some embodiments.

FIG. 3 is a data flow diagram of a method for policy onboarding unification 300, in accordance with some embodiments.

In some embodiments, method for policy onboarding unification 300 describes operations of unification of policy onboarding. While the operations of method for policy onboarding unification 300 are discussed and shown as having a particular order, each operation in method for policy onboarding unification 300 is configured to be performed in any order unless specifically called out otherwise. Method for policy onboarding unification 300 is implemented as a set of operations, such as operations 302 through 320.

At operation 302 of method for policy onboarding unification 300, service builder 358 registers an application bundle, such as application bundles 208 and 210, at bundle catalog 364 of orchestrator 360. In response to submission of the NF application, service builder tool 358 creates an application bundle and automatically registers the application bundle to bundle catalog 364 of orchestrator 360 via an application programming interface (API). A bundle is set of products that are offered under a single entitlement or license with no dedicated components. In bundle catalog 364, a bundle is modelled as a software product with setup relationships to the software products.

In some embodiments, service builder tool 358 is similar to service builder module 120 and includes references to NS bundles as the references are created by a slice manager. The slice manager is responsible for creating a network slice and NS subnet, whereas orchestrator 360 is responsible for creating NSs and NFs. Process flows from operation 302 to operation 304.

In some embodiments, method 300 describes a method for NS bundle creation and transportation. The slice manager takes care of a NS bundle for further execution of the bundle services to northbound systems (handle specific goals of a systematic operation). In some embodiments, method 300 describes a policy bundle which follows the same principle for bundle processing, with additional steps depicting how policy bundles are managed.

At operation 304 of method for policy onboarding unification 300, onboarding service 350 of orchestrator 360 creates bundle/package objects in the central inventory (CI) 352 and stores the bundle/package objects as inventory files. In some embodiments, an object is a variable, a data structure, a function, or a method. As regions of memory, the application bundle objects contain value and are referenced by identifiers. In some embodiments, an application bundle object is a combination of variables, functions, and data structures. In some embodiments, an application bundle object is a table or column, or an association between data and a database entity. Process flows from operation 304 to operation 306.

At operation 306 of method for policy onboarding unification 300, onboarding service 350 sends a request to policy manager 354 for creating the policy descriptor files (e.g., policy name, policy descriptor file (e.g., policy descriptor files 212 and 214), bundle/package UUID, but without source element UUIDs). In some embodiments, application bundle descriptor file is a JSON file (e.g., policy.descriptor.json) that describes the application bundle. The descriptor file includes general information for the application bundle, as well as the modules that the application bundle wants to use or extend. The descriptor file serves as the glue between the remote application (e.g., with user 362) and the application at a CN, such as CN 102. In some embodiments, when an administrator for a cloud instance installs an application, a descriptor file is installed, which contains pointers to a NS. Process flows from operation 306 to operation 308.

At operation 308 of method for policy onboarding unification 300, policy manager 354 returns the policy ID, corresponding to a rule-based policy and an application bundle, to orchestrator 360. Process flows from operation 308 to operation 310.

At operation 310 of method for policy onboarding unification 300, life cycle management (LCM) or network function (NF) planning module 356 stores the policy ID with the package ID. Application LCM is the product lifecycle management (e.g., governance, development, and maintenance) of computer programs. Life cycle encompasses requirements management, software architecture, computer programming, software testing, software maintenance, change management, continuous integration, project management, and release management. Process flows from operation 310 to operation 312.

At operation 312 of method for policy onboarding unification 300, a NF instantiation request (e.g., instantiate a NF using a NFT which includes policy descriptor file with Policy ID) from user 362 is received. Process flows from operation 312 to operation 314.

At operation 314 of method for policy onboarding unification 300, a NF instance is created in CI 352. In some embodiments, a user is instantiating/installing a NF for which the policy bundle has been created. The context of NF instantiation is included to relate that this NF is for policy creation. Process flows from operation 314 to operation 316.

At operation 316 of method for policy onboarding unification 300, orchestrator 360 deploys the NF/application for user 362. Process flows from operation 316 to operation 318.

At operation 318 of method for policy onboarding unification 300, orchestrator 360 sends notification to policy manager 354 to enable rule-based policies with respective policy IDs. Thus, as user 362 is using the application, rule-based policies are in effect for the application. Process flows from operation 318 to operation 320.

At operation 320 of method for policy onboarding unification 300, policy manager 354 modifies the policy files with pending (e.g., source element UUID and the like) information. After filling the pending information, the policy descriptor file becomes a policy template. A policy template table is updated and the enable policy ID is activated. In some embodiments, the template refers to a valid working policy file (i.e., a template is a name ecosystem terminology). A policy template is crated once a created policy has parameters to implement the policy.

Figure 4:
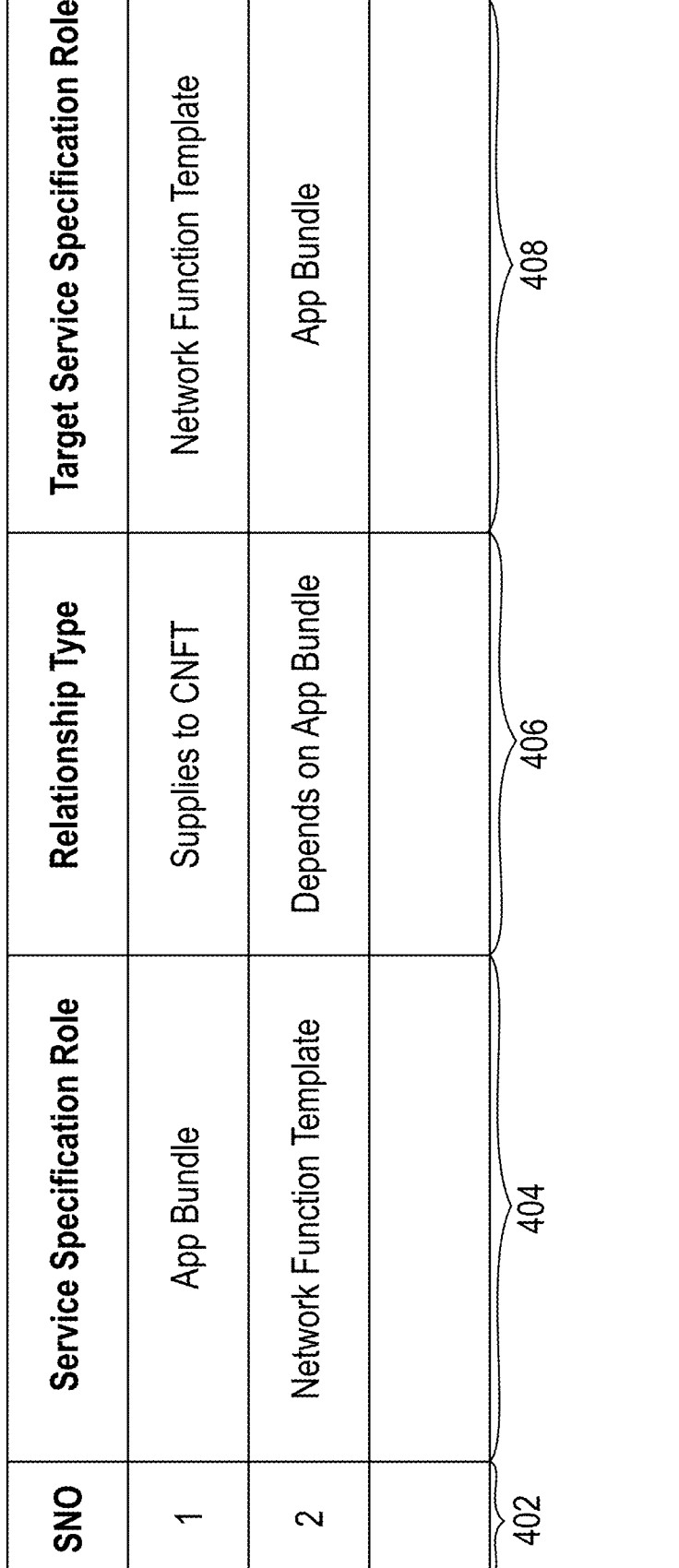
FIG. 4 is a pictorial representation of a complimentary relationship table, in accordance with some embodiments.

FIG. 4 is a pictorial representation of a relationship table 400, in accordance with some embodiments.

Figure 5:
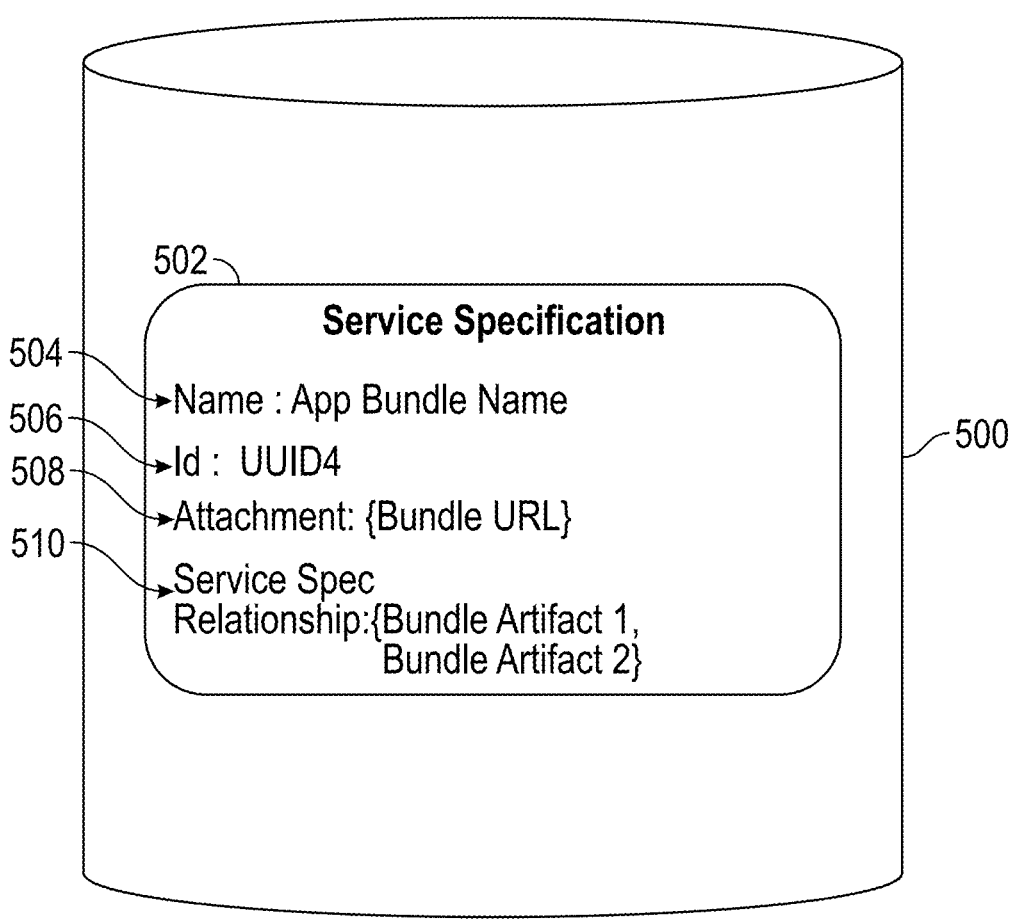
FIG. 5 is a pictorial representation of a service catalog database, in accordance with some embodiments.

FIG. 5 is a pictorial representation of a service catalog database 500, in accordance with some embodiments.

Figure 6:
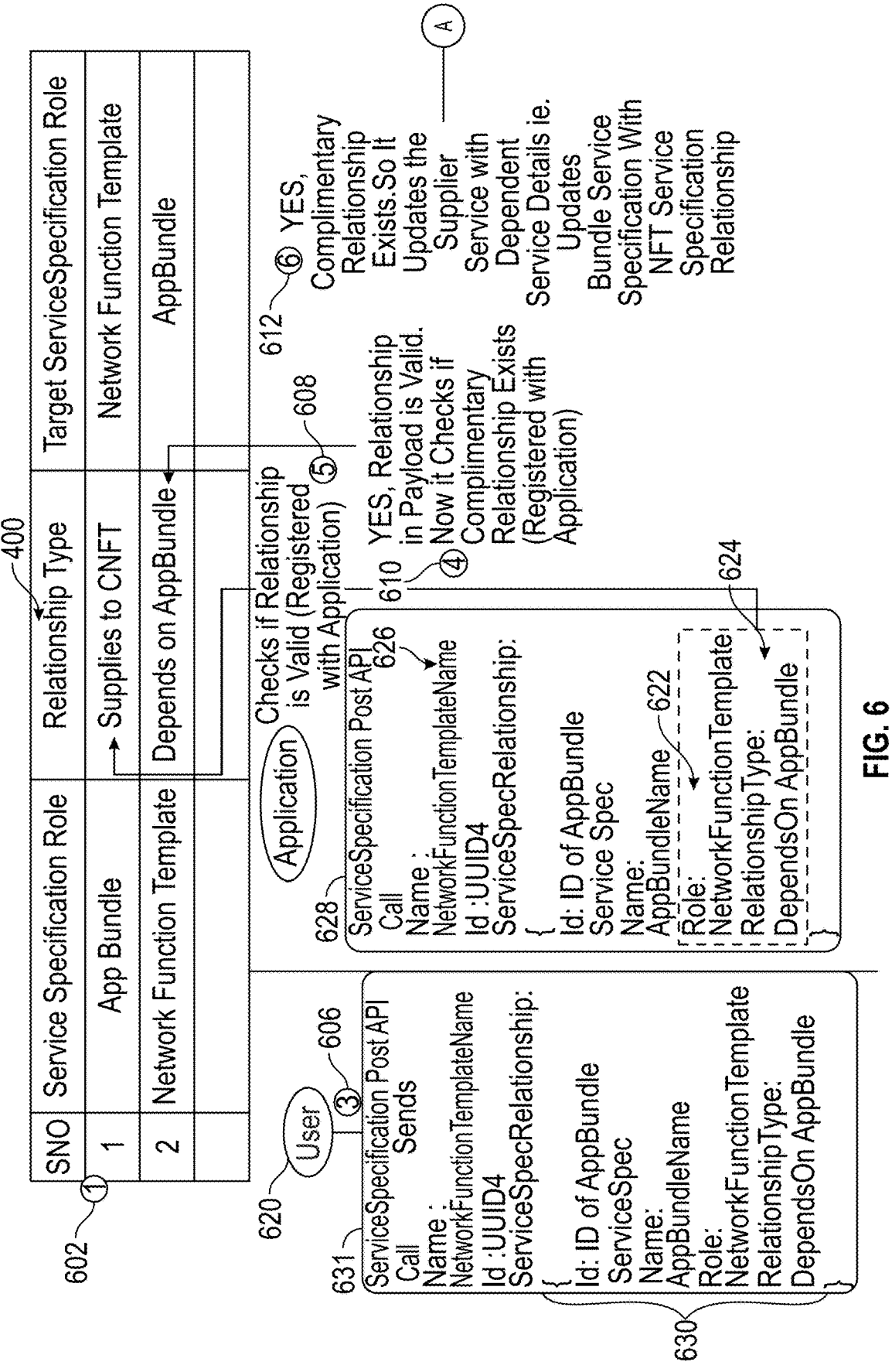
FIG. 6 is a data flow diagrammatic representation of a method for automated bi-directional mapping between service specifications (ABMBSS), in accordance with some embodiments.
Figure 6:
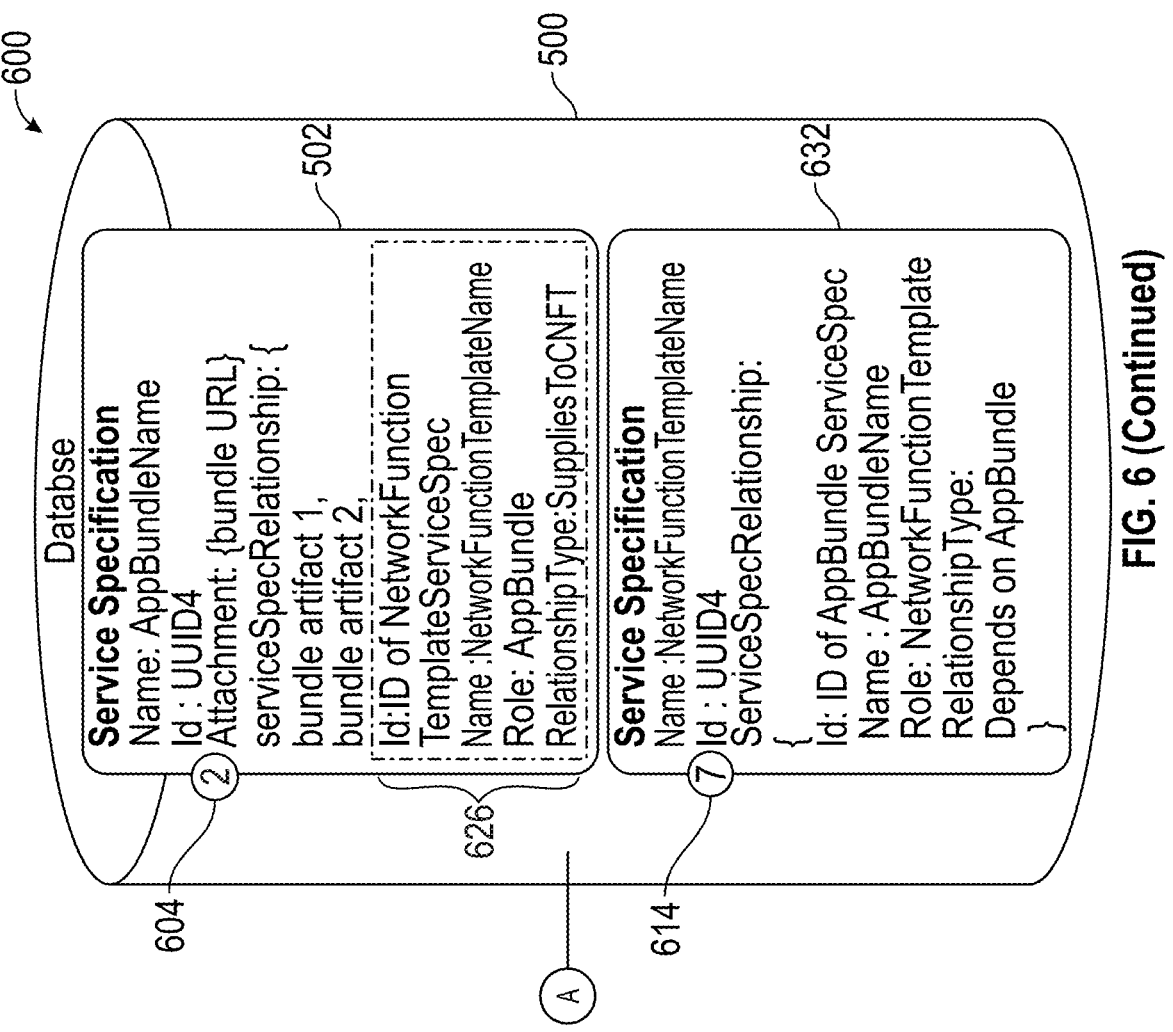

FIG. 6 is a data flow diagrammatic representation of a method for automated bi-directional mapping between service specifications 600 (ABMBSS), in accordance with some embodiments.

FIGS. 4, 5, and 6 are discussed together to provide an understanding of the method for automated bi-directional mapping between NS specifications (ABMBSS) 600. In some embodiments, ABMBSS method 600 is executed by processing circuitry 802 discussed below with respect to FIG. 8. In some embodiments, some, or all the operations of ABMBSS method 600 are executed in accordance with instructions corresponding to instructions 806 discussed below with respect to FIG. 8.

ABMBSS method 600 includes operations 602-614, but the operations are not necessarily performed in the order shown. Operations are added, replaced, order changed, and/or eliminated as appropriate, in accordance with the spirit and scope of the embodiments. In some embodiments, one or more of the operations of ABMBSS method 600 are repeated. In some embodiments, unless specifically stated otherwise, the operations of ABMBSS method 600 are performed in order.

In some embodiments, an application related bundle, which is configured to deploy that application along with artifacts and/or files that are used by other modules. In a non-limiting example, an observability framework (OBF to collect telemetry data from network functions that enable the use of artificial intelligence (AI) and machine learning (ML) to optimize and operate a 5G network to give more visibility into cloud-native network functions' performance and operations in near-real time), cloud management as a service (CMaaS), and/or other modules of the like use a file to deploy the application and to manage the life cycle of that application.

In some embodiments, the service catalog stores the bundle information. As discussed, an application bundles includes files which are used by one or more (e.g., seven or eight) modules within an orchestrator, such as orchestrator 360.

In other approaches, keeping track of the files for each module which is being used by every specific bundle is difficult. Therefore, in some embodiments, a service catalog has been engineered in such a way that in response to a bundle, whether for an application, a network service, or a network template, being onboarded or registered in the service catalog, the service catalog goes through the entire bundle and scans the directory structure. In some embodiments, the service catalog identifies which the deployment files and which files belong within the orchestrator.

Figure 7:
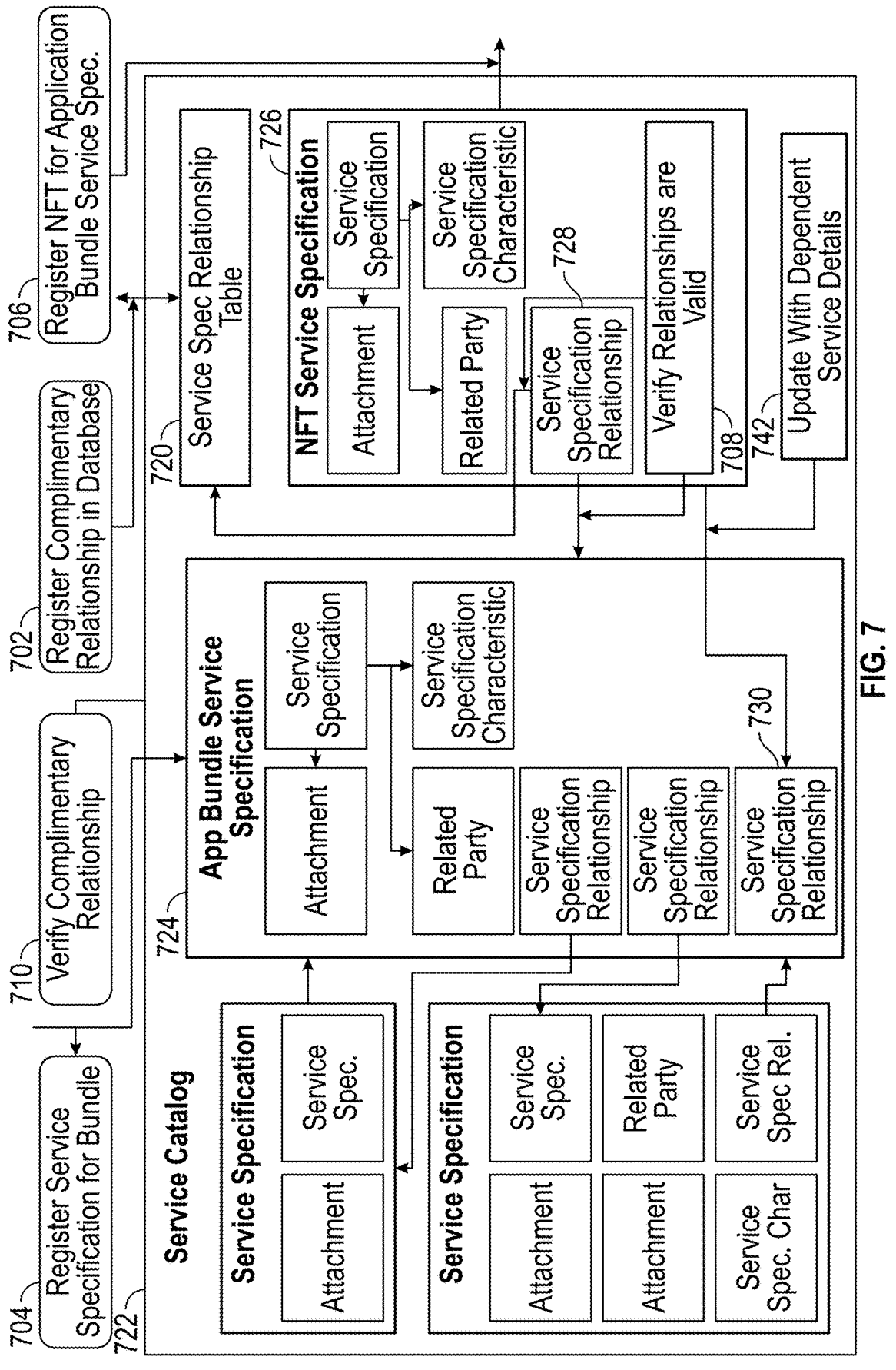
FIG. 7 is a pictorial representation of a method for ABMBSS, in accordance with some embodiments.

In some embodiments, as discussed in FIG. 7, the service catalog is a TMF633 service catalog. Six hundred and thirty-three based module or product. In some embodiments, inputs to the service catalog are in the form of a TMF633 payload specification or service specification.

In some embodiments, the service catalog stores the payload information of a bundle in a database, and whatever files the bundle includes, the service catalog goes through each of the files and identifies a priority of that file, and which module is going to use that file, and it gives the files tags. In some embodiments, the service catalog identifies the file, which includes the details of the bundle, and stores the file. In a non-limiting example, in response to a bundle including five files, the service catalog create six service specifications for this one top level bundle and the other five service specifications are for the files within the bundle.

In other approaches, in response to the service catalog creating these six service specifications, the question became how to map are connect the service specifications.

In some embodiments, a service pack relationship is used to connect service specifications. In computing, a service pack includes a collection of updates, fixes, or enhancements to a software program delivered in the form of a single installable package. Installing a service pack is less error-prone than installing many individual patches.

In some embodiments, the service catalog uses service pack relationships to map the top-level service specification to the lower-level service specifications. Therefore, a user that has access to the top-level routing bundle, is now able to have top-down access for each module that is bused by the child service specifications. This is especially helpful in troubleshooting as the user has access to the parent service specification or the original bundle. The modules are accessed from the bottom up. The user has a top-down access, and the modules using the child service specifications have a bottom-to-top access.

In some embodiments, a user provides the relationships as part of the request body. Often, there is more than a single service specification, but instead multiple service specifications that are related to the top-level specification being created by the user. According to current standards, in response to service specifications being related to one another, a user first provides a relation between a service specification (e.g., service specification A) and another service specification (e.g., service specification B). This means the user first provides a connection between service specification A and service specification B while creating service specification A. Then the user provides a connection between service specification B and service specification A by updating service specification B.

This manual process is a burden for the creator of the service specification, and in the case of a bundle, there are hundreds, even thousands, of other service specifications that are further created. Therefore, some embodiments provide the capability to define such relationships, and once these relationships are defined, the service catalog identifies the relationships and in response to discovering one or more relationships, and automatically creates a paired relationship with the other service specifications. Returning to the non-limiting example, in response to a user creating a relationship for service specification A to service specification B, a bi-directional relationship is automatically created in response to a bi-directional type of service existing.

Some embodiments further include a check of whether the relationship that is defined in the input payload is valid. In some embodiments, a table in a database stores the relationships that are considered valid by the service catalog, and each relationship which is not mentioned in this table is considered invalid and the service catalog throws an error. In some embodiments, the reason behind table verification is to prevent service specification random relationships, as sensitive data is being handled.

In other approaches, in response to a user having service specification already registered, and the registered service specification is to be registered to thirty other service specifications, then the user is to submit thirty different patch calls to relate each of the thirty service specifications to the already registered service specification.

Thus, embodiments discussed save the user the time of making those many extra calls and save on traffic on the service catalog as well as the manual portion of the registration process is eliminated. Further, the error rate of the system is reduced as the human participation in the process is greatly reduced.

In some embodiments, the bi-directional relationship is reduced to just one API POST call. Therefore, continuing with the non-limiting example, a service specification POST API call provided by the user describes a relationship type. This service specification depends on an application bundle, so the service catalog checks the relationship table and in response to a relationship existing in the relationship table, then a valid relationship exists. Now, the service catalog verifies whether the relationship is a complementary relationship.

In FIG. 6, at operation 602 of ABMBSS method 600, predefined relationships between service specifications, such as application bundles and artifacts, service templates, and descriptors are stored in catalog database, such as database 500. In some embodiments, the predefined relationships are complementary relationships between service specifications and stored in a database (DB), such as DB 500, by a service catalog, such as service catalog 722 in FIG. 7. In some embodiments, the predefined relationship is registered with the service catalog and stored in a DB, such as DB 500 in FIG. 5 as relationship table 400 (FIG. 4).

Relationship table 400 includes column 402 that sequentially lists the serial numbers (SNO) of service specifications. In some embodiments, the SNOs are unlimited. In some embodiments, the SNOs are two (as shown) or thirty as discussed above. In some embodiments, the SNOs are a number to quantify the number of service specifications to include in a unilateral or complimentary relationship. In some embodiments, the SNOs are some other suitable identifier that includes at least one of one or more numbers, one or more letters, one or more symbols, one or more graphics, one or more QR codes, one or more bar codes, one or more other suitable identification mechanisms, or a combination thereof.

Relationship table 400 includes column 404 where each service specification role is described for each service from column 402. In the example of FIG. 4, SNO 1 is an application bundle as discussed and described above while SNO 2 is a network function template (NFT), which is further discussed and described above. In some embodiments, the application bundle (e.g., service specification A) is configured to have a relationship with the network function template (e.g., service specification B) and vice versa.

Relationship table 400 includes column 406 where the relationship type is detailed for each service specification from column 402. In the example of FIG. 4, SNO 1, the "parent", supplies to SNO 2 the container network function template (CNFT), the "child", that in complimentary fashion depends on the application bundle.

Operation system (OS)-level virtualization is an OS paradigm in which a kernel (a computer program at the core of a computer's OS and generally has complete control over everything in the system) allows the existence of multiple isolated user space instances, called containers. Such instances look like real computers from the point of view of applications. A computer program executing on an OS sees resources (e.g., connected devices, files and folders, network shares, CPU power, and quantifiable hardware capabilities) of that computer. However, programs running inside of a container see the container's contents and devices assigned to the container.

Relationship table 400 includes column 408 where the target service specification role of the complimentary relationship is described. In the example of FIG. 4. SNO 1 has a target service specification role with the network function template and SNO 2 has a target service specification role with the application bundle.

Thus, from relationship table 400 a complimentary relationship between a first service specification (e.g., application bundle (SNO 1)) and a second service specification (e.g., network function template (SNO 2)) is set forth. In some embodiments, relationship table 400 is created by a network operator or network engineer. In some embodiments, the complementary relationship is established during the design of a network slice. Process flows from operation 602 to operation 604.

At operation 604 of ABMBSS method 600, the service catalog, such as service catalog 722 FIG. 7, stores a service specification for a bundle and artifacts, such as for the application bundle service specification 502, in DB 500. Service specification 502 includes service specification information such as, a name identifier 504 (e.g., appbundlename), an ID 506 (e.g., a UUID as discussed in detail above), an attachment 508 (such as a universal resource locator (URL) for the application bundle), and the service specification relationship 510, such as the relationship with application bundle artifacts, (e.g., bundle artifact 1, and bundle artifact 2).

In some embodiments, each piece of application bundle identification of service specification 502 is stored in DB 500 by the service catalog. In some embodiments, one or more pieces of bundle identification is stored, by the service catalog in DB 500 with service specification 502. In some embodiments, the service specification identification information is completed by a network operator or engineer. In some embodiments, the service specification identification information is automatically inputted and/or registered (e.g., using processing circuitry 800 FIG. 8). Process flows from operation 604 to operation 606.

At operation 606 of ABMBSS method 600 a user 620 (FIG. 6), such as a network operator or engineer, creates service specification payload 630 for registering a service specification in a POST API call to register the service specification with the TMF. In the non-limiting example of FIG. 6, network function templates are created for application bundles and are configured to have a dependent (unilateral) relationship with an application bundle. To create the relationship between the network function template and the application bundle, user 620 provides reference to the bundle service specification in service specification payload 630 of the service specification POST API call 631.

In computer programming, the term payload is in the context of message protocols, that is to differentiate the protocol overhead from the actual data. Reliably sending a payload of data over a communications network involves sending more than just the payload. Sending a payload of data further involves sending various control and signalling data required to reach the destination. This creates a so-called protocol overhead as the additional data does not contribute to the intrinsic meaning of the message.

In a non-limiting example, a service specification POST API call, such as service specification POST API call 631 is:
Service specification relationship=>
    ID: identification of application bundle service specification
    Name: name of application bundle service specification
    Role: role of template service specification in the relationship, such as "dependent"

Relationship Type: relationship of the template service specification to the bundle, such as "depends on"

Payload 630 is received by a service catalog, such as service catalog 722 FIG. 7. In some embodiments, payload 630 is sent via a POST API call 631. Process flows from operation 606 to operation 608.

At operation 608 of ABMBSS method 600, upon receiving POST API call 631, the service catalog verifies whether a relationship between the specifications provided in service specification relationship of payload 630 is valid. In response to the relationship being stored in relationship table 400 at catalog database 500, then the service specification relationship of payload 630 is valid and the service catalog registers service specification 628.

In some embodiments, the service catalog determines whether the role and relationship type included in payload 630 is stored with DB 500 (e.g., relationship table 400). In some embodiments, the determination is a verification of a relationship included in relationship table 400. In the example of FIG. 6, role 622 and relationship type 624 of payload 630 are verified against relationship table 400. Continuing with the non-limiting example, in relationship table 400, in column 404 SNO 2, the relationship type in column 404 is the same as relationship type 624 of payload 630. Further, in column 406 SNO 1, the target service speciation role of column 406 is the same as role 622 of payload 630 and thus the verification is valid and true. In some embodiments, in response to the verification being false, the service catalog informs the user the relationship of payload 630 is not valid. Process flows from operation 608 to operation 610.

At operation 610 of ABMBSS method 600, in response to a valid relationship between payload 630 and relationship table 400, the service catalog determines whether a complimentary relationship exists and is registered (that is, is the reverse relationship (e.g., a relationship between the application bundle and the NFT) valid and true). As discussed above with reference to FIG. 4, the service specification roles of column 404 are related to and cross reference the relationship type of column 406 of relationship table 400. Thus, the complimentary relationship is valid and process flows from operation 610 to operation 612. In some embodiments, in response to the complimentary relationship being invalid or false, the service catalog notifies the user that a complimentary relationship is not established or does not exist.

At operation 612 of ABMBSS method 600, in response to a complimentary relationship existing (e.g., relationship table 400 is verified to include a complimentary relationship), an update is made to application bundle service specification 502 to include dependent service details 626 for the network function template service specification. In the non-limiting example of FIG. 6, service specification 502 is updated with an ID of the dependent service specification (e.g., ID of network function template service specification) taken from service specification POST API call 631, a name (e.g., network function template name) taken from service specification POST API call 631, a role (e.g., application bundle) taken from relationship table 400, and a relationship (e.g., supplies to CNFT) further taken from relationship table 400. In some embodiments, dependent service details 626 are further a payload and are pulled directly from relationship table 400. Continuing with the non-limiting example, application bundle service specification 502 is updated with an NFT service specification relationship. Process flows from operation 612 to operation 614.

At operation 614 of ABMBSS method 600, user 620 stores application bundle service specification 502 with dependent service details 626 that provide a valid relationship within DB 500. Further, application bundle service specification 502 is updated as discussed in operation 612 with a complimentary relationship in one POST API call (in contrast to two separate POST API calls). Additionally, a service specification 632 of service specification POST API call 631 is stored in DB 500.

In some embodiments, the outcome is the same regardless of the number of complimentary relationships to be updated. Whether the updates are between two service specifications as shown in the non-limiting example, or thirty updates in the non-limiting example discussed above, or thousands of possible updates, the process is completed with one POST API call. Thus, making the bi-directional mapping process more efficient by making the process automatic, reducing human interaction, and reducing possible errors due to human interaction.

FIG. 7 is a pictorial representation of a method for automated bi-directional mapping between service specifications 700 (ABMBSS), in accordance with some embodiments.

FIG. 7 is discussed to provide an understanding of method for automated bi-directional mapping between service specifications (ABMBSS) 700. In some embodiments, ABMBSS method 700 is similar to ABMBSS method 600. In some embodiments, ABMBSS method 700 is executed by processing circuitry 802 discussed below with respect to FIG. 8. In some embodiments, some, or all the operations of ABMBSS method 700 are executed in accordance with instructions corresponding to instructions 806 discussed below with respect to FIG. 8.

ABMBSS method 700 includes operations 702-712, but the operations are not necessarily performed in the order shown. Operations are added, replaced, order changed, and/or eliminated as appropriate, in accordance with the spirit and scope of the embodiments. In some embodiments, one or more of the operations of ABMBSS method 700 are repeated. In some embodiments, unless specifically stated otherwise, the operations of ABMBSS method 700 are performed in order.

At operation 702 of ABMBSS method 700, service catalog 722 registers in a database, such as DB 500, a complementary relationship between service specifications. In some embodiments, the complimentary relationship is created based on relationship table 720 developed by a user, such as user 620. In some embodiments, service specification relationship table 720 is like relationship table 400 and further stored in service catalog 722. In FIG. 7, service specification relationship data table 720 is stored within service catalog 722. In some embodiments, service catalog 722 is a TMF633 service catalog. In some embodiments, service catalog 722 is a TMF service catalog API where the service catalog management API allows the management of the entire lifecycle of service catalog elements. Process flows from operation 702 to operation 704

At operation 704 of ABMBSS method 700, service catalog 722 registers a service specification for a bundle, such as application bundle service specification 724. In some embodiments, application bundle service specification 724 is registered the TMF.

In some embodiments, a TMF633 REST API call requests application bundle service specification 724 to register application bundle service specification 724 in TMF. Representational state transfer (REST) allows content to be rendered when the content is requested, often referred to as dynamic content. Process flows from operation 704 to operation 706.

At operation 706 of ABMBSS method 700, a network function template service specification 726 is registered for application bundle service specification 724. In some embodiments, network function template service specification 726 is registered for application bundle service specification 724 with TMF. In some embodiments, a TMF633 REST API call requests NFT service specification 726 to register NFT service specification 726, which includes a relationship to application bundle service specification 724 included in service specification relationship 728 in TMF. Process flows from operation 706 to operation 708.

At operation 708 of ABMBSS method 700, service catalog 722 determines whether a relationship within a payload of service specification relationship 728 exists and is valid within service speciation relationship table 720. In a non-limiting example, service specification relationship 728 contains a payload with reference to application bundle service specification 724. Continuing with the non-limiting example, the payload is:

name: application bundle (e.g., application bundle service specification 724)
    relationship type: depends on application bundle
    role: application bundle
    type: service specification relationship
    Process flows from operation 708 to operation 710.

At operation 710 of ABMBSS method 700, in response to a valid relationship between the payload within service specification relationship 728 and relationship table 720, a determination is made as to whether a complimentary relationship between NFT service specification 726 and application bundle service specification 724 exists within service specification table 720 and is registered. In response to a complimentary relationship existing in specification table 720, process flows from operation 710 to operation 712.

Figure 8:
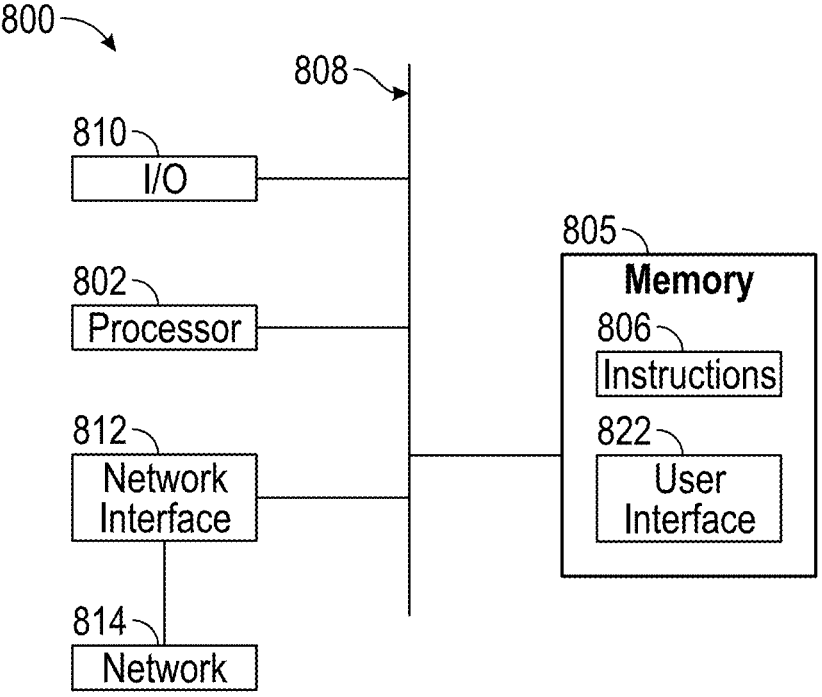
FIG. 8 is a high-level functional block diagram of a processor-based system, in accordance with some embodiments.

At operation 712 of ABMBSS method 700, in response to a complimentary relationship existing, an update is made to application bundle service specification 724 service specification relationship 730 to include dependent service details. Continuing with the non-limiting example, the payload is:

name: network function template name (e.g., NFT service specification 726)
    relationship type: supplies to CNFT
    role: application bundle
    type: service specification relationship FIG. 8 is a block diagram of automated bi-directional mapping between service specifications (ABMBSS) processing circuitry 800 in accordance with some embodiments. In some embodiments, ABMBSS processing circuitry 800 is a general-purpose computing device including a hardware processor 802 and a non-transitory, computer-readable storage medium 804. Storage medium 804, amongst other things, is encoded with, i.e., stores, computer program code 806, i.e., a set of executable instructions such as an algorithm, or methods 300, 600 and 700. Execution of instructions 806 by hardware processor 802 represents (at least in part) an automated bi-directional mapping between service specifications application which implements a portion, or all the methods described herein in accordance with one or more embodiments (hereinafter, the noted processes and/or methods).

Processor 802 is electrically coupled to a computer-readable storage medium 804 via a bus 808. Processor 802 is further electrically coupled to an I/O interface 810 by bus 808. A network interface 812 is further electrically connected to processor 802 via bus 808. Network interface 812 is connected to a network 814, so that processor 802 and computer-readable storage medium 804 connect to external elements via network 814. Processor 802 is configured to execute computer program code 806 encoded in computer-readable storage medium 804 to cause ABMBSS processing circuitry 800 to be usable for performing a portion or all the noted processes and/or methods. In one or more embodiments, processor 802 is a central processing unit (CPU), a multi-processor, a distributed processing system, an application specific integrated circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause ABMBSS processing circuitry 800 to be usable for performing a portion or all the noted processes and/or methods. In one or more embodiments, storage medium 804 further stores information, such as an algorithm which facilitates performing a portion or all the noted processes and/or methods.

ABMBSS processing circuitry 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

ABMBSS processing circuitry 800 further includes network interface 812 coupled to processor 802. Network interface 812 allows ABMBSS processing circuitry 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, is implemented in two or more ABMBSS processing circuitry 800.

ABMBSS processing circuitry 800 is configured to receive information through I/O interface 810. The information received through I/O interface 810 includes one or more of instructions, data, design rules, and/or other parameters for processing by processor 802. The information is transferred to processor 802 via bus 808. ABMBSS processing circuitry 800 is configured to receive information related to UI 822 through I/O interface 810. The information is stored in computer-readable medium 804 as user interface (UI) 822.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

In some embodiments, a method for bi-directional mapping includes storing, by a processor, a relationship between a first service specification and a second service specification within a database; receiving, by the processor, an application programming interface (API) call for the second service specification that includes a payload that includes a relationship type; verifying, by the processor, the relationship type included in the payload corresponds to a relationship type of the relationship between the first service specification and the second service specification stored within the database; in response to the relationship type included in the payload corresponding to the relationship type of the relationship between the first service specification and the second service specification stored within the database, verifying, by the processor, whether a complimentary relationship exists between the first service specification and the second service specification; and in response to the complimentary relationship existing between the first service specification and the second service specification, updating, by the processor, the first service specification with dependent service details of the relationship between the first service specification and the second service specification.

In some embodiments, the storing the relationship between the first service specification and the second service specification within the database includes storing, by the processor, one or more predefined relationships between application bundles and application artifacts, service templates, and descriptors in the database, where the database is a service catalog database and the first and second service specifications include one or more service specifications.

In some embodiments, the method further includes storing, by the processor, the one or more service specifications with the predefined relationships between an application bundle and one or more application artifacts.

In some embodiments, the receiving the API call for the second service specification that includes the payload that includes the relationship type; includes receiving, by the processor, a service specification relationship included in the API call that includes a first service specification identification (ID); a first service specification name; a second service specification role; and a first service specification relationship type.

In some embodiments, the verifying the relationship type included in the payload corresponds to the relationship type of the relationship between the first service specification and the second service specification stored within the database includes verifying, by the processor, the relationship type included in the payload corresponds to the relationship type of the relationship between the first service specification and the second service specification stored in a relationship table stored in the database, where the relationship table includes the relationship between the first service specification and the second service specification.

In some embodiments, the relationship table includes one or more of specification identifiers; service specification roles; service specification relationship types; and service specification target service specification roles.

In some embodiments, the verifying whether the complimentary relationship exists between the first service specification and the second service specification includes comparing, by the processor, a target service specification role in the relationship table for the first service specification with the second service specification role for; comparing, by the processor, a target service specification role in the relationship table for the second service specification with a first service specification role for; in response to the target service specification role for the first service specification matching the service specification role for the second service specification and the target service specification role for the second service specification matching the service specification role for the first service specification, determining, by the processor, the complimentary relationship exists.

In some embodiments, the method further includes storing, by the processor, the second service specification that includes the service specification relationship with the first service specification in the database.

In some embodiments, an apparatus includes a processor; and a memory having instructions stored thereon that, in response to being executed by the processor, cause the apparatus to store a relationship between a first service specification and a second service specification within a database; receive an application programming interface (API) call for the second service specification that includes a payload that includes a relationship type; verify the relationship type included in the payload corresponds to a relationship type of the relationship between the first service specification and the second service specification stored within the database; in response to the relationship type included in the payload corresponding to the relationship type of the relationship between the first service specification and the second service specification stored within the database, verify whether a complimentary relationship exists between the first service specification and the second service specification; and in response to the complimentary relationship existing between the first service specification and the second service specification, update the first service specification with dependent service details of the relationship between the first service specification and the second service specification.

In some embodiments, the apparatus is caused to store the relationship between the first service specification and the second service specification within the database by storing one or more predefined relationships between application bundles and application artifacts, service templates, and descriptors in the database, where the database is a service catalog database and the first and second service specifications include one or more service specifications.

In some embodiments, the apparatus is further caused to store one or more service specifications with predefined relationships between an application bundle and one or more application artifacts.

In some embodiments, the apparatus is caused to receive the API call for the second service specification that includes the payload that includes the relationship type by receiving a service specification relationship included in the API call that includes a first service specification identification (ID); a first service specification name; a second service specification role; and a first service specification relationship type.

In some embodiments, the apparatus is caused to verify the payload relationship type corresponds to the relationship type of the relationship between the first service specification and the second service specification stored within the database by verifying the relationship type included in the payload corresponds to the relationship type of the relationship between the first service specification and second service specification stored in a relationship table stored in the database, where the relationship table includes the relationship between the first service specification and the second service specification.

In some embodiments, the relationship table includes one or more of specification identifiers; service specification roles; service specification relationship types; and service specification target service specification roles.

In some embodiments, the apparatus is caused to verify whether the complimentary relationship exists between the first service specification and the second service specification by comparing a target service specification role in the relationship table for the first service specification with the second service specification role; comparing a target service specification role in the relationship table for the second service specification with a first service specification role; and in response to the target service specification role for the first service specification matching the service specification role for the second service specification and the target service specification role for the second service specification matching the service specification role for the first service specification, determining the complimentary relationship exists.

In some embodiments, the apparatus is further caused to store the second service specification that includes the service specification relationship with the first service specification in the database.

In some embodiments, a non-transitory computer readable medium having instructions stored thereon that, in response to being executed by a processor, cause an apparatus to store a relationship between a first service specification and a second service specification within a database; receive an application programming interface (API) call for the second service specification that includes a payload that includes a relationship type; verify the relationship type included in the payload corresponds to a relationship type of the relationship between the first service specification and the second service specification stored within the database; in response to the relationship type included in the payload corresponding to the relationship type of the relationship between the first service specification and the second service specification stored within the database, verify whether a complimentary relationship exists between the first service specification and the second service specification; and in response to the complimentary relationship existing between the first service specification and the second service specification, update the first service specification with dependent service details of the relationship between the first service specification and the second service specification.

In some embodiments, the apparatus is caused to store the relationship between the first service specification and the second service specification within the database by storing one or more predefined relationships between application bundles and application artifacts, service templates, and descriptors in the database, where the database is a service catalog database and the first and second service specifications include one or more service specifications.

In some embodiments, the apparatus is further caused to store one or more service specifications with predefined relationships between an application bundle and one or more application artifacts.

In some embodiments, the apparatus is caused to receive the API call for the second service specification that includes the payload that includes the relationship type by receiving a service specification relationship included in the API call that includes a first service specification identification (ID); a first service specification name; second service specification role; and a first service specification relationship type.

The foregoing outlines features of several embodiments so that those skilled in the art better understand the aspects of the present disclosure. Those skilled in the art should appreciate that they readily use the present disclosure as a basis for designing or modifying other processes and structures for conducting the same purposes and/or achieving the same advantages of the embodiments introduced herein. Those skilled in the art should further realize that such equivalent constructions do not depart from the spirit and scope of the present disclosure, and that they make various changes, substitutions, and alterations herein without departing from the spirit and scope of the present disclosure.

What is claimed is:

1. A method for bi-directional mapping, comprising:

storing, by a processor, a relationship between a first service specification and a second service specification within a database;

receiving, by the processor, an application programming interface (API) call for the second service specification that includes a payload that includes a relationship type;

verifying, by the processor, the relationship type included in the payload corresponds to a relationship type of the relationship between the first service specification and the second service specification stored within the database;

in response to the relationship type included in the payload corresponding to the relationship type of the relationship between the first service specification and the second service specification stored within the database, verifying, by the processor, whether a complimentary relationship exists between the first service specification and the second service specification; and in response to the complimentary relationship existing between the first service specification and the second service specification, updating, by the processor, the first service specification with dependent service details of the relationship between the first service specification and the second service specification.

2. The method for bi-directional mapping of claim 1, wherein:

the storing the relationship between the first service specification and the second service specification within the database comprises:

storing, by the processor, predefined relationships between application bundles and application artifacts, service templates, and descriptors in the database, where the database is a service catalog database and the first and second service specifications include one or more service specifications.

3. The method for bi-directional mapping of claim 2, further comprising:

storing, by the processor, the one or more service specifications with the predefined relationships between an application bundle and one or more application artifacts.

4. The method for bi-directional mapping of claim 1, wherein:

the receiving the API call for the second service specification that includes the payload that includes the relationship type comprises:

receiving, by the processor, a service specification relationship included in the API call that includes:

a first service specification identification (ID);

a first service specification name;

a second service specification role; and a first service specification relationship type.

5. The method for bi-directional mapping of claim 4, wherein:

the verifying the relationship type included in the payload corresponds to the relationship type of the relationship between the first service specification and the second service specification stored within the database comprises:

verifying, by the processor, the relationship type included in the payload corresponds to the relationship type of the relationship between the first service specification and the second service specification stored in a relationship table stored in the database, where the relationship table includes the relationship between the first service specification and the second service specification.

6. The method for bi-directional mapping of claim 5, wherein:

the relationship table includes one or more of:
  specification identifiers;
  service specification roles;
  service specification relationship types; and
  service specification target service specification roles.

7. The method for bi-directional mapping of claim 6, wherein:

the verifying whether the complimentary relationship exists between the first service specification and the second service specification comprises:

comparing, by the processor, a target service specification role in the relationship table for the first service specification with the second service specification role;

comparing, by the processor, a target service specification role in the relationship table for the second service specification with a first service specification role; and in response to the target service specification role for the first service specification matching the service specification role for the second service specification and the target service specification role for the second service specification matching the service specification role for the first service specification, determining, by the processor, the complimentary relationship exists.

8. The method for bi-directional mapping of claim 6, further comprising:

storing, by the processor, the second service specification that includes the service specification relationship with the first service specification in the database.

9. An apparatus, comprising:

a processor; and a memory having instructions stored thereon that, in response to being executed by the processor, cause the apparatus to:

store a relationship between a first service specification and a second service specification within a database;

receive an application programming interface (API) call for the second service specification that includes a payload that includes a relationship type;

verify the relationship type included in the payload corresponds to a relationship type of the relationship between the first service specification and the second service specification stored within the database;

in response to the relationship type included in the payload corresponding to the relationship type of the relationship between the first service specification and the second service specification stored within the database, verify whether a complimentary relationship exists between the first service specification and the second service specification; and in response to the complimentary relationship existing between the first service specification and the second service specification, update the first service specification with dependent service details of the relationship between the first service specification and the second service specification.

10. The apparatus of claim 9, wherein the apparatus is caused to store the relationship between the first service specification and the second service specification within the database by storing one or more predefined relationships between application bundles and application artifacts, service templates, and descriptors in the database, where the database is a service catalog database and the first and second service specifications include one or more service specifications.

11. The apparatus of claim 10, wherein the apparatus is further caused to:

store one or more service specifications with predefined relationships between an application bundle and one or more application artifacts.

12. The apparatus of claim 9, wherein the apparatus is caused to receive the API call for the second service specification that includes the payload that includes the relationship type by:

receiving a service specification relationship included in the API call that includes:
  a first service specification identification (ID);
  a first service specification name;
  a second service specification role; and
  a first service specification relationship type.

13. The apparatus of claim 12, wherein the apparatus is caused to verify the relationship type included in the payload corresponds to the relationship type of the relationship between the first service specification and the second service specification stored within the database by:

verifying the relationship type included in the payload corresponds to the relationship type of the relationship between the first service specification and the second service specification stored in a relationship table stored in the database, where the relationship table includes the relationship between the first service specification and the second service specification.

14. The apparatus of claim 13, wherein:

the relationship table includes one or more of:
  specification identifiers;
  service specification roles;
  service specification relationship types; and
  service specification target service specification roles.

15. The apparatus of claim 14, wherein the apparatus is caused to verify whether the complimentary relationship exists between the first service specification and the second service specification by:

comparing a target service specification role in the relationship table for the first service specification with the second service specification role;

comparing a target service specification role in the relationship table for the second service specification with a first service specification role; and in response to the target service specification role for the first service specification matching the service specification role for the second service specification and the target service specification role for the second service specification matching the service specification role for the first service specification, determining the complimentary relationship exists.

16. The apparatus of claim 15, wherein the apparatus is further caused to:

store the second service specification that includes the service specification relationship with the first service specification in the database.

17. A non-transitory computer readable medium having instructions stored thereon that, in response to being executed by a processor, cause an apparatus to:

store a relationship between a first service specification and a second service specification within a database;

receive an application programming interface (API) call for the second service specification that includes a payload that includes a relationship type;

verify the relationship type included in the payload corresponds to a relationship type of the relationship between the first service specification and the second service specification stored within the database;

in response to the relationship type included in the payload corresponding to the relationship type of the relationship between the first service specification and the second service specification stored within the database, verify whether a complimentary relationship exists between the first service specification and the second service specification; and in response to the complimentary relationship existing between the first service specification and the second service specification, update the first service specification with dependent service details of the relationship between the first service specification and the second service specification.

18. The non-transitory computer readable medium of claim 17, wherein the apparatus is caused to store the relationship between the first service specification and the second service specification within the database by:

storing one or more predefined relationships between application bundles and application artifacts, service templates, and descriptors in the database, where the database is a service catalog database and the first and second service specifications include one or more service specifications.

19. The non-transitory computer readable medium of claim 18, wherein the apparatus is further caused to:

store one or more service specifications with predefined relationships between an application bundle and one or more application artifacts.

20. The non-transitory computer readable medium of claim 17, wherein the apparatus is caused to receive the API call for the second service specification that includes the payload that includes the relationship type by:

receiving a service specification relationship included in the API call that includes:

a first service specification identification (ID);

a first service specification name;

a second service specification role; and a first service specification relationship type.

* * * * *